(12) United States Patent
Burkart et al.

(10) Patent No.: US 9,297,345 B2
(45) Date of Patent: Mar. 29, 2016

(54) HIGH PRESSURE CONTROL VALVE

(75) Inventors: Harald Burkart, Villingen-Schwenningen (DE); Wolfram Maiwald, Villengen-Schwenningen (DE); Wei Yu, Tamm (DE); Frank Zelano, St. Georgen (DE); Ralf Heingl, Villengen-Schwenningen (DE); Stefanie Gerhardt, Friedrichshafen (DE)

(73) Assignee: KENDRION BINDER MAGNETE GMBH, Villingen-Schwenningen (DE)

( * ) Notice: Subject to any disclaimer, the term of this patent is extended or adjusted under 35 U.S.C. 154(b) by 0 days.

(21) Appl. No.: 13/275,655

(22) Filed: Oct. 18, 2011

(65) Prior Publication Data

US 2012/0266977 A1    Oct. 25, 2012

(30) Foreign Application Priority Data

Oct. 21, 2010 (DE) .......................... 10 2010 049 022

(51) Int. Cl.
*F02M 63/00* (2006.01)
*F02M 63/02* (2006.01)
*F16K 31/06* (2006.01)

(52) U.S. Cl.
CPC .......... *F02M 63/0077* (2013.01); *F02M 63/005* (2013.01); *F02M 63/0036* (2013.01); *F02M 63/0052* (2013.01); *F02M 63/025* (2013.01); *F16K 31/0665* (2013.01);
(Continued)

(58) Field of Classification Search
CPC .......... F02M 63/0077; F02M 63/0052; F02M 63/005; F02M 63/025; F02M 63/0036; F02M 2200/02; F02M 2200/04; F16K 31/0665; Y10T 137/7793

USPC .......... 251/129.01, 129.15, 129.19, 359–362, 251/333
See application file for complete search history.

(56) References Cited

U.S. PATENT DOCUMENTS

| 3,593,738 A | * | 7/1971 | Baerfuss | 137/109 |
| 3,902,521 A | * | 9/1975 | Keller et al. | 137/375 |
| 4,167,198 A | * | 9/1979 | Kotyza et al. | 137/528 |

(Continued)

FOREIGN PATENT DOCUMENTS

| CN | 1904345 A | 1/2007 |
| CN | 101434236 | 5/2009 |

(Continued)

OTHER PUBLICATIONS

PCT/EP2011/005323 Search Report mailed Aug. 28, 2012, 11 pages—German, 3 pages—English.

(Continued)

*Primary Examiner* — Marina Tietjen
(74) *Attorney, Agent, or Firm* — Andrew F. Young, Esq.; Lackenbach Siegel, LLP

(57) ABSTRACT

A high pressure control valve system with a valve body with an inlet and an outlet, whereby the outlet is shaped by at least one radially oriented opening in the valve body, an essentially discoidally shaped valve seat arranged on the valve body between inlet and outlet and features a valve body bore that connects inlet and outlet, a sealing element that is appropriately arranged on an actuating element in order to close the valve bore, and an actuating device suitably shaped to move the actuating element in such a way as to cause the opening and closing of the valve, characterized in that the valve seat on the exit site features a revolving extension, extending from a foot print axially in direction of the opening.

14 Claims, 3 Drawing Sheets

(52) U.S. Cl.
CPC ....... *F02M 2200/02* (2013.01); *F02M 2200/04* (2013.01); *Y10T 137/7793* (2015.04)

(56) References Cited

U.S. PATENT DOCUMENTS

| | | | | |
|---|---|---|---|---|
| 4,474,208 A | * | 10/1984 | Looney | 137/516.29 |
| 4,506,690 A | * | 3/1985 | Mitchell | 137/1 |
| 5,087,016 A | * | 2/1992 | Advenier et al. | 251/129.15 |
| 5,937,896 A | * | 8/1999 | Miyajima et al. | 137/539 |
| 7,178,553 B2 | * | 2/2007 | Peric et al. | 137/630.22 |
| 7,331,564 B2 | * | 2/2008 | Moreno et al. | 251/129.02 |
| 7,441,546 B2 | * | 10/2008 | Mitsumata et al. | 123/472 |
| 2008/0185548 A1 | * | 8/2008 | Takahashi et al. | 251/129.15 |
| 2009/0121541 A1 | * | 5/2009 | Lee et al. | 303/119.2 |
| 2009/0194174 A1 | * | 8/2009 | Morgan et al. | 137/469 |
| 2011/0118098 A1 | * | 5/2011 | Harms et al. | 493/2 |

FOREIGN PATENT DOCUMENTS

| | | |
|---|---|---|
| DE | 690 00 606 | 7/1993 |
| DE | 197 00 980 | 7/1998 |
| DE | 10 2008 042 801 | 4/2009 |
| DE | 10 2008 042801 | 4/2009 |
| DE | 10 2008 014 098 | 5/2009 |
| EP | 1 748 240 | 7/2006 |
| JP | 2007 040106 | 2/2007 |

OTHER PUBLICATIONS

EP Pat. Appln. Serial No. 11 790 723.8 Search Report mailed Jun. 16, 2013, 6 pages—German, 3 pages—English.

CN 201110462546.5 Office Action dated Nov. 18, 2014, 7 pages—English, 6 pages—Chinese.

DE 10 2010 049 022.9 Office Action dated Jun. 15, 2015, 2 pages—English, 5 pages—German.

CN 201110462546.5 Office Action dated Jul. 21, 2015, 8 pages—English, 6 pages—Chinese.

\* cited by examiner

HIGH PRESSURE CONTROL VALVE

CROSS REFERENCE TO RELATED APPLICATIONS

This application claims priority from DE 10 2010 049 022.9 filed Oct. 21, 2010, the entire contents of which are incorporated herein by reference.

FIGURE FOR PUBLICATION

FIG. 2

BACKGROUND OF THE INVENTION

1. Field of the Invention

The present invention relates to a high-pressure regulating valve. More particularly, the present invention relates to high-pressure regulating valve configured with a radially oriented opening in the valve body and improved performance.

2. Description of the Related Art

The high-pressure regulating of fluids occurs generally by means of ball-seat valves. These are as a rule electromagnetically actuated. Electromagnetically operated high-pressure regulating valves of the prior art are generally built as follows, an example is depicted in FIG. 3.

The valve 1 has a valve body 2 with an inlet 20 and an outlet 21, in which pressures up to 2400 bar can occur at present at the inlet side or in the area of application of the common-rail motors. Between the inlet 20 and the outlet 21 there is disposed a valve seat 3, through which passes a valve bore 30, connecting the inlet 20 and outlet 21. The valve bore 30 can be sealed off at the outlet end by a sealing means 4, which is generally designed as a sealing ball. The sealing ball 4 can be pressed against the valve seat 3 by a valve pin 5 for this purpose. On account of the increased loads acting through the sealing ball 4, the valve seat 3 is made of hardened steel. For cost considerations, the rest of the valve body 2 is made of unhardened steel.

The valve seat 3 is disposed on the valve body 2 such that it connects the inlet end and the outlet end. The valve seat 3 is basically configured as a plate at the outlet end and has a recess in the area of the valve bore 30, in which the sealing ball 4 comes to lie. At the inlet end, it is press-fitted into the valve body 2.

The outlet 21 is formed by radial bores 23 at the outlet side of the valve body 2. To achieve the most compact possible form of the high-pressure regulating valve 1, the radial bores are disposed as closely as possible beneath the valve seat 3. Thanks to this design, a shoulder 22 is formed between the valve seat 3 and the outlet bores 23, against which the valve seat 3 is braced while screwing the valve together.

The valve pin 5 is mounted in a lengthwise bore of the valve body 2 and can be moved along its longitudinal axis by an electromagnetic drive unit 6, disposed at the outlet end. The drive unit 6 is not shown at present. It is generally constructed from a coil 61 through which current can be passed, disposed on a coil holder 60, and an armature 62 that can be actuated by a generated magnetic field. The armature 62 and the valve pin 5 are welded or press-fitted together and thus permanently joined to each other. The armature 62, furthermore, is biased by a compression spring 68 in the closing direction of the valve, so that the valve 1 is closed when no current is passing through the coil 61.

The armature 62 and the compression spring 68 are mounted at the rear in a bushing 65, which is fastened to the valve body or by a welded ring 66. The valve pin 5 is held centered in the bushing 65 by a bearing 69.

The regulating of the flow of fluid occurs by the lifting off of the sealing ball 4 from the valve seat 3. In the present high-pressure regulating valves 1, the maximum lift, i.e., the lift achieved at maximum opening of the valve, is 0.2-0.5 mm. Upon opening of the valve, due to the pressure acting on the sealing ball 4 from the inlet side, very high flow velocities of the regulated fluid are reached. The fluid then impinges with this high flow velocity against the shoulder 22 of the valve body 2 at the outlet end and erodes it, i.e., in the course of the lifetime of the valve increasingly more material of the shoulder 22 is ablated, so that its material thickness is attenuated.

An attenuation of the valve body 2 in this area implies serious drawbacks in regard to the lifetime of the valve, since with increasing erosion less force can be transmitted from the screw connection via the valve seat 3 to the valve body 2, so that the valve ultimately loses its tightness in the area of the press fitting.

A further drawback of erosion is the subsequent ablation of material. Particles of the ablated material can get into the fuel system and thus, for example, lead to damaging of the high-pressure pump of the fuel system.

The problem of the present invention is to provide a high-pressure regulating valve that does not have at least one of the above-mentioned concerns. Accordingly, there is a need for a high-pressure regulating valve that overcomes one of the concerns noted above.

ASPECTS AND SUMMARY OF THE INVENTION

A high pressure control valve system with a valve body with an inlet and an outlet, whereby the outlet is shaped by at least one radially oriented opening in the valve body, an essentially discoidally shaped valve seat arranged on the valve body between inlet and outlet and features a valve body bore that connects inlet and outlet, a sealing element that is appropriately arranged on an actuating element in order to close the valve bore, and an actuating device suitably shaped to move the actuating element in such a way as to cause the opening and closing of the valve, characterized in that the valve seat on the exit site features a revolving extension, extending from a foot print axially in direction of the opening.

One of the proposed goals, but not a requirement, is to provide a high-pressure regulating valves to enable a use at higher pressures than the current 2700-3000 bar, while at the same time lessening the material erosion.

A high-pressure regulating valve according to the invention has a valve body with an inlet and an outlet, wherein the outlet is formed by at least one opening that is essentially radially oriented in the valve body. An essentially disk-shaped valve seat is disposed in the valve body between inlet and outlet and has a valve bore that joins the inlet and the outlet together. Furthermore, a sealing element is provided, which is disposed on an actuating element suitable for the tight closing of the valve bore. The actuating element, furthermore, can be moved by means of an actuating mechanism so as to bring about an opening and closing of the valve. According to the invention, the valve seat is configured such that it has an encircling projection extending axially in the opening direction from a base surface of the valve seat at the outlet end.

In this way, a fluid building up at the opening with high pressure, which flows with high velocity when the valve is opened on account of the very narrow flow cross section in the beginning of the opening process, is taken along the projection and thus does not impinge with full velocity against the laterally extending valve body. Since the valve seat and thus also the projection molded onto the valve seat are made of hardened steel, an erosion of the valve body occurring thus far is significantly reduced.

An especially advantageous configuration of the projection in terms of fluid mechanics is achieved when it is formed as a funnel-shaped collar. In this way, flow turbulence can be reduced. Depending on the angle of widening of the funnel-shaped collar, a lift-dependent characteristic of the flow cross section can also be configured.

When the projection covers at least half the distance between the base surface and the opening, already a significant reduction of the valve body erosion in the area of the exit opening can be achieved.

It is advantageous for the projection to cover at least 9/10 of the distance between the base surface and the opening, ideally the entire distance between the base surface and the opening being covered by the projection.

In this way, in particular, a shoulder situated between the base surface of the valve seat and the exit opening is protected against material erosion [and] a concomitant weakening of the material located there. This is especially important because the shoulder lying between the valve seat and the exit opening braces the valve seat that is press fitted in the valve body.

The projection, furthermore, can be configured such that a direct flow against the valve body when the valve is opened is entirely eliminated.

In this way, no material ablation occurs, even in other areas of the valve body, and so the penetrating of particles into the fuel circuit is avoided.

The projection can furthermore have a recess adapted to the sealing element, so that an optimized bearing surface is formed for the seal between the valve seat and the sealing element.

The sealing element is preferably formed as a sealing ball. This has the advantage that an especially good sealing can occur in regard to a bore, thanks to the rotationally symmetrical configuration of a ball.

An actuation of the sealing element can occur especially easily when the actuating element is fashioned as an actuating pin. A pin-shaped configuration of the actuating element has the advantage that this can be led especially easily through the valve body in the direction of the actuating mechanism, which is designed as an electromagnet, for example.

It is especially advantageous in terms of fluid mechanics when a flow cross section is formed between the actuating element and the projection so that flow turbulence is reduced. In this way, an especially regular fluid flow is achieved and forces induced in the fluid circulation by turbulence are reduced.

The above, and other aspects, features and advantages of the present invention will become apparent from the following description read in conduction with the accompanying drawings, in which like reference numerals designate the same elements.

DETAILED DESCRIPTION OF THE PREFERRED EMBODIMENTS

Figure 1:
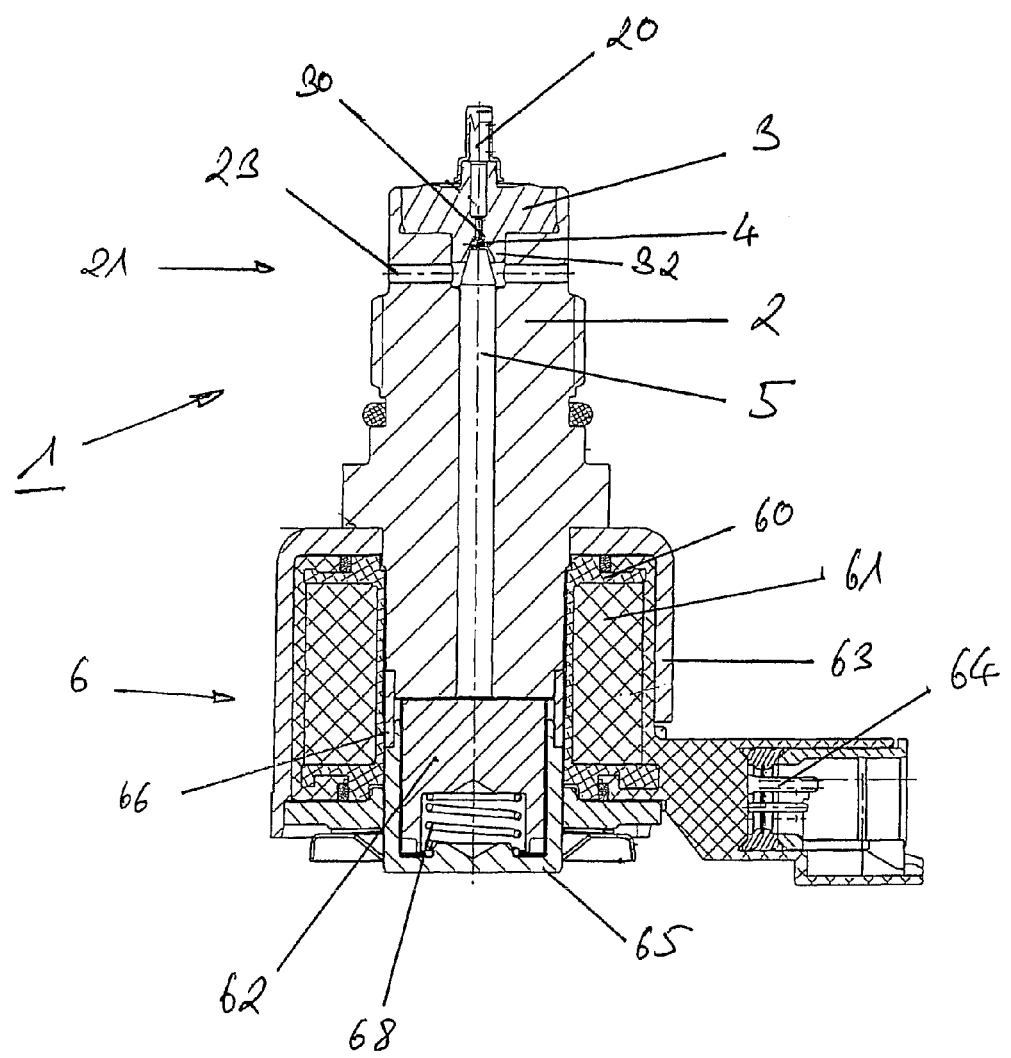
FIG. 1 is a cross-sectional view of a high-pressure regulating valve according to the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

FIG. 1 shows a cross section through a high-pressure regulating valve 1 according to the invention. The high-pressure regulating valve 1 has an essentially cylindrical valve body 2 that has an axially oriented inlet 20 and a radially oriented outlet 21. The outlet 21 in the present case is formed by radially oriented bores 23. At the inlet side, a disk-shaped valve seat 3 is disposed on the valve body 2, which joins the inlet 20 and the outlet 21 via a valve bore 30. The valve seat 3 is supported against the valve body 2 by a press fit and is tensioned in the direction of the valve body 2 when the valve 1 is installed.

At the outlet side, the valve bore 30 can be closed by a sealing element 4, fashioned as a sealing ball. The sealing ball 4 can be pressed against the valve seat 3 by an actuating element 5, formed as an actuating pin and mounted in an axially oriented bore of the valve body 2, in order to close the valve bore 30. The valve pin 5 can be axially closed by an actuating arrangement 6, which is the present case is configured as an electromagnet 6. The electromagnet 6 is basically composed of a coil 61, arranged circumferential to the valve body 2 on a coil holder 60, as well as an armature 62 mounted and able to move axially inside the coil 61, and it is connected by a housing 63 to the valve body 2. A movement of the armature 62 in the axial direction is transmitted by the valve pin 5 to the sealing ball 4, so that an opening and closing of the high-pressure regulating valve becomes possible. The armature 62 is additionally mounted in a bushing 65 and biased by means of a compression spring 68 in the direction of the valve seat 5. The high-pressure regulating valve 1 is thus closed in the non-energized state of the coil 61 up to a pressure that is determined by the spring force of the compression spring 68. When the pressure rises beyond this, an additional energizing of the coil 61 is needed to hold the high-pressure regulating valve 1 shut against a pressure building up at the inlet 20.

An energizing of the coil 61 can occur by contacts 64 led in laterally from the outside.

Figure 2:
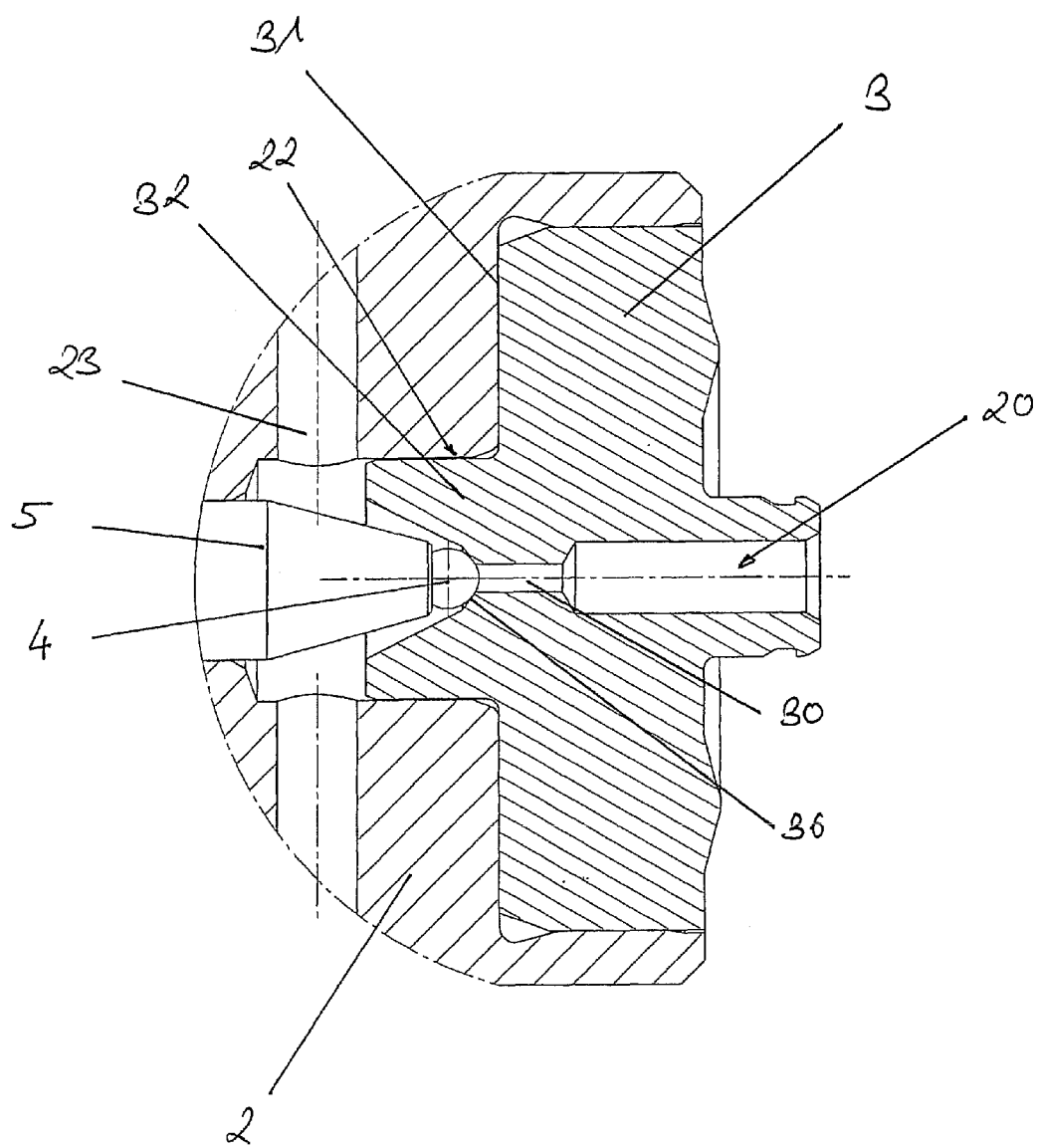
FIG. 2 depicts an enlarged view of the intersection between armature and valve pin of the valve from FIG. 1.
Figure 3:
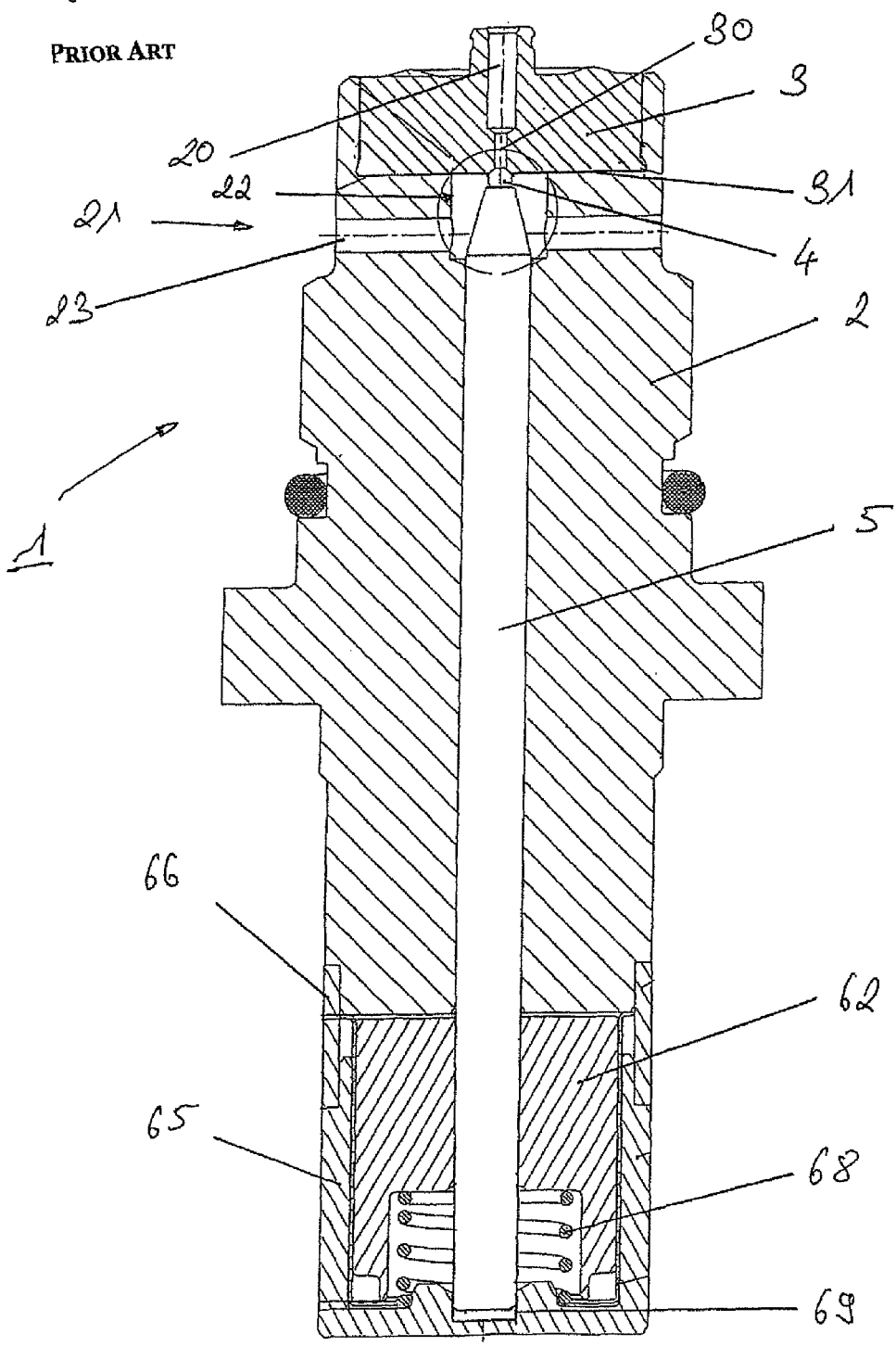
FIG. 3 depicts a cross-sectional view of a conventional high-pressure regulating valve.

FIG. 2 shows an enlarged view of the valve seat of the high-pressure regulating valve from FIG. 1.

In this representation, one can clearly notice that the valve seat 3, starting from a base surface 31 of the valve seat, is prolonged in the direction of the radially oriented bore 23 of the outlet 21. This projection 32 is formed as an encircling collar-shaped projection 32, which broadens out in funnel manner starting from the valve bore 30. The projection 32 continues approximately to the radially oriented bore 23, so that roughly 9/10 of the shoulder 22 formed between the radially oriented bore 23 and the base surface of the valve seat 31 is covered by the projection 32. In this way, a fluid arriving at the inlet end with high pressure and flowing past the sealing ball 4 with very high flow velocity when the valve is opened is not directly steered against the shoulder 22. In this way, erosion of the valve body 2 is prevented in this area. The sealing ball 4 can be pressed by the valve pin 5 against a receptacle 36 situated at the outlet-side end of the valve bore 30. Better sealing behavior of the valve seat 3 can be accomplished with a receptacle 36 adapted to the valve ball 4.

Thanks to a funnel-shaped broadening out of the projection 32, starting from the end of the valve bore 30 at the outlet side, one can achieve a lift-dependent characteristic of the flow cross section that is opened up, so that an optimized flow rate and flow regulation can be achieved.

Thanks to an appropriate configuration of the funnel-shaped broadening of the projection 32, furthermore, a reduction of flow turbulence can be achieved at the exit side of the high-pressure regulating valve 1.

| List of reference symbols | |
| --- | --- |
| 1 | high-pressure regulating valve |
| 2 | valve body |
| 3 | valve seat |
| 4 | sealing element |
| 5 | actuating element |
| 6 | actuating mechanism |
| 20 | inlet |
| 21 | outlet |
| 22 | shoulder/distance |
| 23 | opening/bore |
| 30 | valve bore |
| 31 | base surface |
| 32 | projection |
| 33 | receptacle |
| 60 | coil holder |
| 61 | coil |
| 62 | armature |
| 63 | housing |
| 64 | contacts |
| 65 | bushing |
| 66 | welding |
| 68 | compression spring |
| 69 | bearing |

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

The invention claimed is:

1. A high pressure regulating valve system, comprising:
a valve body having an operative inlet and an operative outlet wherein the outlet is shaped by at least one radially oriented opening within said valve body, one essentially discoidally shaped valve seat arranged in a press-fit configuration with said valve body between said inlet and said outlet;
further including a sealing element which is operatively arranged on an actuating element operative to close a valve bore and an actuating device suitably shaped to move said actuating element to cause axial opening and closing of said valve bore;
wherein said valve seat on an exit side includes a circumferential extension extending axially from a foot print arranged in a direction of said axial opening, said extension further comprising a conically shaped opening therein, and said extension projecting axially in the direction of said axial opening above the sealing element in a closed state of the valve bore, and
wherein when the valve bore is opened, fluid building up at the operative inlet is operatively directed to move along the extension, thereby reducing pressure against laterally extending surfaces of the valve body, and wherein the extension is formed of a hardened material.

2. The high pressure regulating valve system according to claim 1, wherein: said extension is operatively shaped as a funnel-shaped expanding collar.

3. A high pressure regulating valve system, comprising:
a valve body having an inlet and an outlet;
said outlet bounding at least one opening radially oriented with said valve body;
an essentially disk-shaped valve seat;
said valve seat operably disposed in a press-fit configuration with said valve body between said inlet and said outlet;
said valve seat having a valve bore in an operable connection with said inlet and said outlet;
a sealing element operably disposed on an actuating element operable to close said valve bore during a use thereof, and
an actuating mechanism being operably configured to move the actuating element and actuate said valve system during said use;
said valve seat including an encircling projection;
said encircling projection extending axially in a direction of said opening from a base surface proximate said outlet, and said encircling projection extending axially in the direction of said opening above the sealing element in a closed state of the valve bore,
wherein when the valve bore is opened, fluid building up at the inlet is operatively directed to move along the encircling projection, thereby reducing pressure against laterally extending surfaces of the valve body, and wherein the encircling projection is formed of a hardened material.

4. The high pressure regulating valve system according to claim 3, wherein said projection is a funnel-shaped collar projection.

5. The high pressure regulating valve system according to claim 4, wherein said projection covers at least one half of a distance between said base surface and said opening.

6. The high pressure regulating valve system according to claim 5, wherein said projection covers at least 90% of said distance between said base surface and said opening.

7. The high pressure regulating valve system according to claim 6, wherein said projection covers the entire said distance between said base surface and said opening.

8. The high pressure regulating valve system according to claim 7, wherein said projection is operably configured to prevent a flow in a flow direction against said valve body during an open condition for said valve bore.

9. The high pressure regulating valve system according to claim 8, wherein said projection further comprises a recess operably shaped to receive said sealing element.

10. The high pressure regulating valve system according to claim 9, wherein said the sealing element is configured as a sealing ball.

11. The high pressure regulating valve system according to claim 10, wherein said actuating element is configured as an actuating pin.

12. The high pressure regulating valve system according to claim 11, wherein a flow cross section formed between said sealing element and said projection is operative to reduce a flow turbulence during said use of said high pressure regulating valve system.

13. A high pressure control valve system, comprising:

a valve body having an inlet and an outlet, said outlet bounding at least one opening radially oriented with said valve body;

an essentially disk-shaped valve seat;

said valve seat operably disposed in a press-fit configuration with said valve body between said inlet and said outlet;

said valve seat having a valve bore in an operable connection with said inlet and said outlet;

a sealing element operably disposed on an actuating element operable to close said bore valve during a use thereof;

an actuating mechanism being operably configured to move the actuating element and actuate said valve system during said use;

said valve seat including an encircling projection;

said encircling projection extending axially in a direction of said opening from a base surface proximate said outlet; said projection is a funnel-shaped collar projection;

said projection covers at least one half of a distance between said base surface and said opening; and said projection further comprises a recess operably shaped to receive said sealing element, and said projection extending axially in the direction of said opening above the sealing element in a closed state of the valve bore, wherein when the valve bore is opened, fluid building up at the inlet is operatively directed to move along the encircling projection, thereby reducing pressure against laterally extending surfaces of the valve body, and wherein the encircling projection is formed of a hardened material.

14. The high pressure control valve system according to claim 13, wherein said projection covers at least 90% of said distance between said base surface and said opening.

\* \* \* \* \*

UNITED STATES PATENT AND TRADEMARK OFFICE
CERTIFICATE OF CORRECTION

PATENT NO. : 9,297,345 B2
APPLICATION NO. : 13/275655
DATED : March 29, 2016
INVENTOR(S) : Burkart et al.

It is certified that error appears in the above-identified patent and that said Letters Patent is hereby corrected as shown below:

TITLE PAGE

In the Assignee (73) the following correction is made:

KENDRION BINDER MAGNETE, GMBH should be changed to --KENDRION (VILLINGEN) GMBH--

Signed and Sealed this
Ninth Day of August, 2016

Michelle K. Lee
*Director of the United States Patent and Trademark Office*